United States Patent
Shimada

(10) Patent No.: US 7,453,602 B2
(45) Date of Patent: Nov. 18, 2008

(54) COLOR CONVERSION METHOD

(75) Inventor: Takuya Shimada, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 570 days.

(21) Appl. No.: 11/138,330

(22) Filed: May 27, 2005

(65) Prior Publication Data
US 2005/0264837 A1    Dec. 1, 2005

(30) Foreign Application Priority Data
Jun. 1, 2004    (JP)    ............................. 2004-163751
Jun. 14, 2004    (JP)    ............................. 2004-175998

(51) Int. Cl.
| G06F 15/00 | (2006.01) |
| G06K 1/00 | (2006.01) |
| G06K 9/00 | (2006.01) |
| H04N 1/60 | (2006.01) |
| G03F 3/08 | (2006.01) |
| G09G 5/02 | (2006.01) |

(52) U.S. Cl. ..................... 358/1.9; 358/518; 345/590; 382/167

(58) Field of Classification Search ................ 358/1.9, 358/518
See application file for complete search history.

(56) References Cited

U.S. PATENT DOCUMENTS

| 5,760,913 | A | * | 6/1998 | Falk ............................ 382/167 |
| 6,814,420 | B2 | | 11/2004 | Fujita et al. .................... 347/15 |
| 6,882,445 | B1 | * | 4/2005 | Takahashi et al. ............. 358/1.9 |
| 7,003,151 | B2 | | 2/2006 | Shimada ....................... 382/162 |
| 2002/0000993 | A1 | * | 1/2002 | Deishi et al. ................. 345/590 |
| 2002/0039106 | A1 | | 4/2002 | Shimada ....................... 345/604 |
| 2003/0048464 | A1 | | 3/2003 | Yamada et al. ................ 358/1.9 |
| 2003/0202194 | A1 | | 10/2003 | Torigoe et al. ................ 358/1.9 |
| 2004/0105582 | A1 | * | 6/2004 | Boesten et al. ............... 382/170 |
| 2005/0195417 | A1 | | 9/2005 | Shimada ....................... 358/1.9 |
| 2006/0012809 | A1 | | 1/2006 | Shimada ....................... 358/1.9 |

FOREIGN PATENT DOCUMENTS

| JP | 07-200814 | 8/1995 |
| JP | 2001-325826 | 11/2001 |

* cited by examiner

*Primary Examiner*—Mark K Zimmerman
*Assistant Examiner*—Fan Zhang
(74) *Attorney, Agent, or Firm*—Fitzpatrick, Cella, Harper & Scinto

(57) ABSTRACT

To obtain suitable reproduction of an image reproduced on an input system on an output system, when a color signal A acquired from an image processing device is contained in a low-saturation area on the color space containing a color signal P of gray for an image output device at a lightness of the color signal A and a color signal O of calorimetrically achromatic color, the color signal A is converted in accordance with a conversion function that converts the color signal on a line segment BP, which connects a color signal B that is the intersection of a line segment AP connecting the color signal A and the color signal P and the outermost contour of the low-saturation area, and the color signal P into a color signal on a line segment BO connecting the color signal B and the color signal O. On the other hand, when the color signal A is not contained in the low-saturation area, the color signal is not converted.

17 Claims, 13 Drawing Sheets

FIG. 4

| GL (R=G=B) | L* | a* | b* |
|---|---|---|---|
| 0 | xx | xx | xx |
| ⋮ | ⋮ | ⋮ | ⋮ |
| 255 | xx | xx | xx |

COLOR CONVERSION METHOD

FIELD OF THE INVENTION

The present invention relates to a color conversion method for converting a color signal generated by an image input/output device into a color signal in a color space for color matching.

BACKGROUND OF THE INVENTION

Since the color characteristics of image input/output devices are varied depending on the device, when certain color image data is shared between different devices, there is a problem that the color combination reproduced by each device may be unmatched even when the color image data is the same. To solve this problem, a color management system (hereinafter referred to as a "CMS") is utilized to unify the color appearance of color image between different devices.

In the CMS, to excellently reproduce the same color image on plural image input/output devices (e.g., color copy, color monitor, digital camera, color printer and so on), a color signal of each device is converted into a color signal in a color space for color matching, in which the color signal of an input system is converted into the color signal of an output system so that they may be matched in this color space, if possible. Herein, the input system designates a device aimed at the color matching. For example, when the color of a color printer B is matched with the color of a color printer A, the color printer A is the input system, and the color printer B is the output system. Also, the color space for color matching is generally a calorimetric color space, such as CIE/XYZ, CIE/LAB and CIE/LCh (e.g., refer to Japanese Patent Laid-Open No. 7-200814 (patent document 1)).

However, especially in a low-saturation area, an excellent image may not be reproduced by simply matching the colorimetric values. For example, if the ink or toner is employed as a white color signal of the color printer, it is perceived as "color cast", which makes a bad visual impression, even if the colorimetric values are matched. Therefore, for the white color typically reproduced on the color printer, the color of an image recording medium (printing paper) itself is employed, without depending on the colorimetric value of the input system.

Also, the black color is often reproduced in the maximal density color intrinsic to the device to utilize a dynamic range of the device to the maximum, and the gray of intermediate lightness is typically a value dependent on the device, because the chromaticity is continuously changed from white to black. That is, it is required in some cases that the image is not reproduced to match the colorimetric value, but reproduced in the color intrinsic to the device, depending on the kind of color. And in such cases, in the color space for color matching, for example, it is desired that the color signal corresponding to gray of the input system and the color signal corresponding to gray of the output system, which are different calorimetrically, are matched.

The color space for color matching with the corrected gray line to meet the above requirement (hereinafter referred to as a "color space S") is employed in which the equal lightness plane is translated so that the color signal of gray containing white and black may become the color signal having the same lightness and representing the achromatic color (saturation=0) in the colorimetric color space based on three attributes of color perception of lightness, saturation and hue.

FIG. 7 is a diagram showing the relationship between such a colorimetric color space and color space S using the equal lightness plane in the CIE/LAB space. In FIG. 7, the abscissa is a*, the ordinate is b*, point P is a point indicating the gray, point P' is a point indicating calorimetrically achromatic color, 71 is a gamut of the device in the calorimetric color space, and 72 is a gamut of the device in the color space S. As shown in FIG. 7, the color signal in the color space S is translated from the color signal in the calorimetric color space along a vector PP'.

By this translation (parallel displacement), the gray of each device is represented by a point on the same straight line (axis of lightness), and treated as the color of the same chromaticity point. Also, in the color space S, a line segment indicated by the gray of the input system and a line segment indicated by the gray of the output system can be easily matched by compression/extension on the same straight line, and due to this compression/extension, the color signals indicating the while color and the black color of the input system can be matched respectively with the color signals indicating the white color and the black color of the output system. A technique for preventing color cast by moving the gray line was described in Japanese Patent Laid-Open No. 2001-326826 (patent document 2).

However, in the color space S, the color conversion for converting the achromatic color signal has influence not only on the achromatic color but also on chromatic colors, resulting in a new problem, that color signals indicating the same calorimetric values for the chromatic color may be unmatched. For example, in the color space S, the flesh color (skin tones) of each device is reproduced by a different color signal, whereby the skin tones of the input system cannot be suitably reproduced by the output system. FIG. 8 is a diagram showing the equal lightness plane in the CIE/LAB space to explain the conventional color conversion method. In FIG. 8, the abscissa is a*, the ordinate is b*, point Pi is a point indicating the calorimetric value of color on the gray line in the input system, point Po is a point indicating the calorimetric value of color on the gray line in the output system, point P' is a point indicating calorimetrically achromatic color, point C is a point indicating the colorimetric value of a skin tone color, point Ci' is a point indicating the color signal in the color space S for the input system corresponding to the color at point C, and point Co' is a point indicating the color signal in the color space S for the output system corresponding to the color at point C indicating the colorimetric value of flesh color.

With the conventional method as shown in FIG. 8, the color signal in the color space S corresponding to the color on the gray line of each device can be represented by point P' without regard to the device, but the color signal in the color space S corresponding to the flesh color of each device is different depending on the device, and indicated at point Ci' in the input system and point Co' in the output system. Accordingly, even if the color signal in the input system is converted into the color signal in the output system so that they may be matched in the color space S, the flesh color of the input system and the flesh color of the output system may be different, resulting in a less excellent reproduced image.

SUMMARY OF THE INVENTION

The present invention has been proposed to solve the conventional problems, and has as its objects to provide a color conversion method in which for conversion of color signals between the image output devices having different color reproduction characteristics, the same color signal for both achromatic color and chromatic color can be converted into the color signal in the same color space for color matching, whereby an image reproduced on an input system is suitably reproduced on an output system.

In order to achieve the above object, the present invention provides a color conversion method for converting a color signal for an image output device into a color signal in a color space for color matching, in which if an input signal A lies within the low-saturation region containing P, then A is subjected to a conversion that maps A onto a line segment that is determined by O (an achromatic-color point corresponding to P), and B, which as mentioned is the intersection of line segment PA with the outermost contour of the low-saturation region. If A is not within that region, however, then A is not subjected to such conversion. As a result, if color signal A represents a color such as a skin tone, which can be expected not to occur within a low-saturation region, it will be left unaffected, while the benefits of the low-saturation-region processing will still be obtained for those signals where it is most needed.

Also, in order to achieve the above object, the invention provides a color conversion method for converting a color signal for an image output device into a color signal in a color space for color matching, comprising:

a first acquisition step of acquiring a color signal of an image output device;

a first conversion step of converting the color signal into a color signal A on a colorimetric color space;

a second conversion step of acquiring a color signal P of gray for the image output device at a lightness of the color signal A;

a determination step of determining whether or not the color signal A is contained in a low saturation area containing the color signal P and a color signal O of calorimetrically achromatic color at a lightness of the color signal A;

a third acquisition step of acquiring a color signal B that is an intersection between a line segment connecting the color signal P and the color signal A and the outermost contour of the low saturation area, when it is determined that the color signal A is contained in the low saturation area at the determination step;

a second conversion step of converting the color signal A into the color signal D in accordance with a conversion function of converting the color signal on the line segment connecting the color signal B and the color signal P into the color signal on the line segment connecting the color signal B and the color signal O; and an output step of outputting the color signal D.

Moreover, in order to achieve the above object, the invention provides an image processing method comprising:

converting a converted color signal into a uniform color space signal;

calculating a gray signal of an image forming apparatus;

determining whether or not the uniform color space signal is inside a low saturation area; and correction processing the uniform color space signal according to the gray signal if it is inside the low saturation area as a result of determination.

Further, in order to achieve the above object, the invention provides a color conversion method for converting a color signal of a predetermined image output device into a color signal in a color mapping color space that is a common color space for mutually converting the color signals of plural kinds of image output devices, comprising:

a first conversion step of converting the color signal of the predetermined image output device into a color signal A in a uniform color space; and a second conversion step of converting the color signal A in the uniform color space into the color signal in the color mapping color space;

wherein the second conversion step comprises converting the color signal inside the low saturation area R that is set in the uniform color space and the color signal outside the low saturation area R into the color signal in the color mapping color space in different ways.

Further, in order to achieve the above object, the invention provides a profile creation device for creating the profile data for mutually converting a color signal of a predetermined image output device into a color signal in a color mapping color space that is a common color space for mutually converting the color signals of plural kinds of image output devices, comprising:

first conversion means for converting a discrete color signal C of the predetermined image output device into a color signal A in a uniform color space;

second conversion means for converting the color signal A into a color signal D in the color mapping color space; and profile creation means for creating a profile from the correspondent information between the discrete color signal C and the color signal D;

wherein the second conversion step comprises converting the color signal A into the color signal in the color mapping color space in different ways, depending on whether the color signal A exists inside the low saturation area R that is preset in the uniform color space or outside the low saturation area R.

Further, in order to achieve the above object, the invention provides a profile creation method for creating the profile data for mutually converting a color signal of a predetermined image output device and a color signal in a color mapping color space that is a common color space for mutually converting the color signals of plural kinds of image output devices, comprising:

a first conversion step of converting a discrete color signal C of the predetermined image output device into a color signal A in a uniform color space;

a second conversion step of converting the color signal A into a color signal D in the color mapping color space; and a profile creation step of creating a profile from the correspondent information between the discrete color signal C and the color signal D;

wherein the second conversion step comprises converting the color signal A into the color signal in the color mapping color space in different ways, depending on whether the color signal A exists inside the low saturation area R that is preset in the uniform color space or outside the low saturation area R.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 4 is a diagram showing one example of a gray line table acquired in step S201;

DETAILED DESCRIPTION OF THE PREFERRED EMBODIMENTS

The preferred embodiments of the present invention will be described below in detail with reference to the drawings.

First Embodiment

<CMS>

Figure 13:
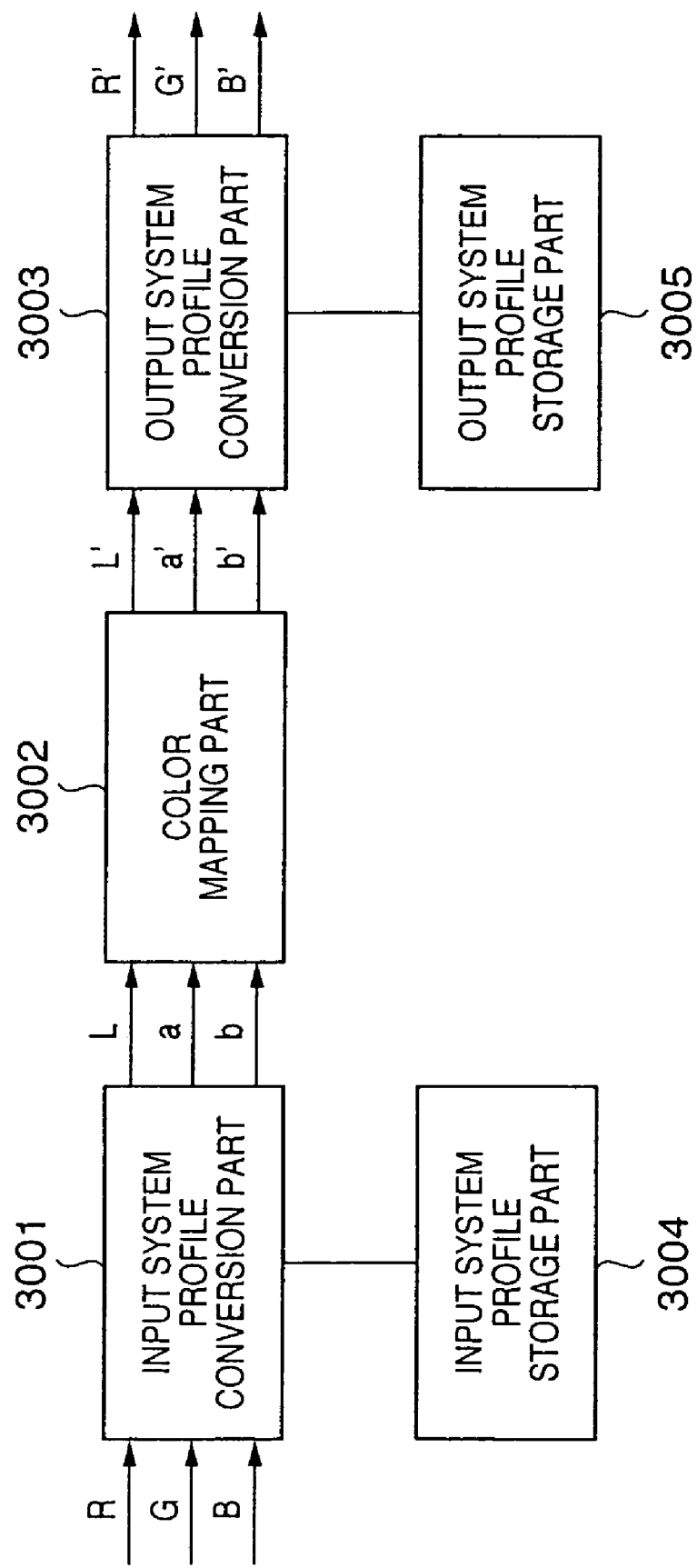
FIG. 13 is a diagram for explaining the outline of CMS according to the embodiment of the invention.

First of all, the outline of a CMS according to one embodiment of the invention will be described below with reference to FIG. 13. In the CMS of this embodiment as shown in FIG. 13, the color signals RGB of an input system is converted into the color signals R'G'B' of an output system through an input system profile conversion part 3001, a color mapping part 3002, an output system profile conversion part 3003, an input system profile storage part 3004, and an output system profile storage part 3005.

The input system profile conversion part 3001 converts the color signals RGB of the input system into the color signals Lab in a color mapping color space, employing an input system profile stored in the input system profile storage part 3004. The input system profile used herein is a lookup table (hereinafter referred to as an LUT) holding the output color signals Lab pertaining to the discrete input color signals RGB, for example. The input system profile conversion part 3001 converts any input color signals RGB into the corresponding output color signals Lab by a well-known interpolation method with the LUT.

The color mapping part 3002 converts the input color signals Lab into the color signals L'a'b' reproducible on the output system. When the input system and the output system have the same gamut, the color mapping part 3002 typically outputs the input color signals Lab directly. When the input system and the output system have different gamuts, the color mapping part 3002 converts the input color signals Lab into the output color signals L'a'b' by a well-known gamut compressing or expanding method. The output system profile conversion part 3003 converts the color signals L'a'b' in the color mapping color space into the color signals R'G'B' of the output system, employing an output system profile stored in the output system profile storage part 3005, for example. The output system profile used herein is an LUT holding the input color signals L'a'b' pertaining to the discrete output color signals R'G'B', for example. The output system profile conversion part 3003 converts any input color signals L'a'b' into the corresponding output color signals R'G'B' by a well-known retrieval or interpolation method using the LUT.

A color conversion method for acquiring the color signals (Lab and L'a'b') from the color signals (RGB and R'G'B') of the system in the CMS will be described below as the first embodiment. Also, a method for creating the profiles stored in the input system profile storage part 3004 and the output system profile storage part 3005 in the CMS will be described below as the second embodiment. Also, a recreation method for interactively adjusting the profile created in the second embodiment will be described as the third embodiment.

<Outline of Color Conversion Method>

Figure 1:
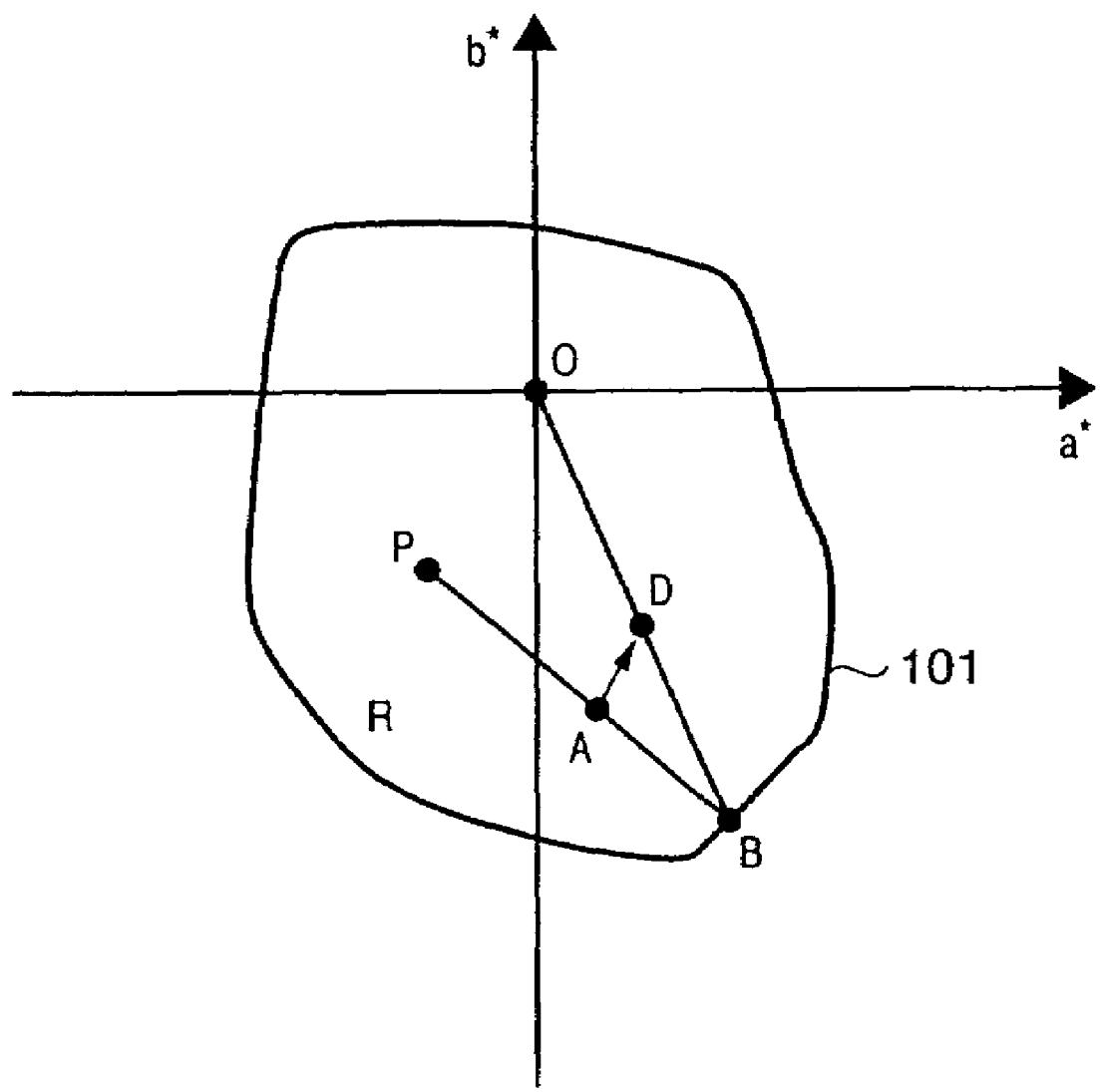
FIG. 1 is a typical view for explaining the outline of a color conversion method according to one embodiment of the present invention.

FIG. 1 is a typical view for explaining a color conversion method according to the first embodiment of the present invention, and shows an equal lightness plane in a CIELAB color space as one example of a uniform color space. In FIG. 1, point P is a point indicating the gray intrinsic to an image output device, point O is a point indicating the achromatic color, 101 designates the outermost contour of a low-saturation area R containing point P and point O, and point B is any point on the outermost contour 101 of the area R. At this time, the color conversion method of this embodiment converts the color indicated by point A on the line segment BP into the color indicated by point D on the line segment BO so that the ratio of PB to PA may be equal to the ratio of OB to OD, for example. Also, the color outside the area R is not converted (input color signals are directly outputted).

Due to these features, with the color conversion method of this embodiment, the gray P that has different calorimetric value depending on the image output device is converted to be the same color signal indicated by point O, and the color outside the area R such as flesh (skin tone) color or memory color is converted so that the color of the same calorimetric value may be the same color signal. Of course, if a different processing than in the area R is done, such memory colors as grass-green, leaf-green and sky-blue may be corrected to obtain special vividness, and flesh colors may be subjected to such a preferable color correction as to add red.

<Color Conversion Procedure>

Figure 2:
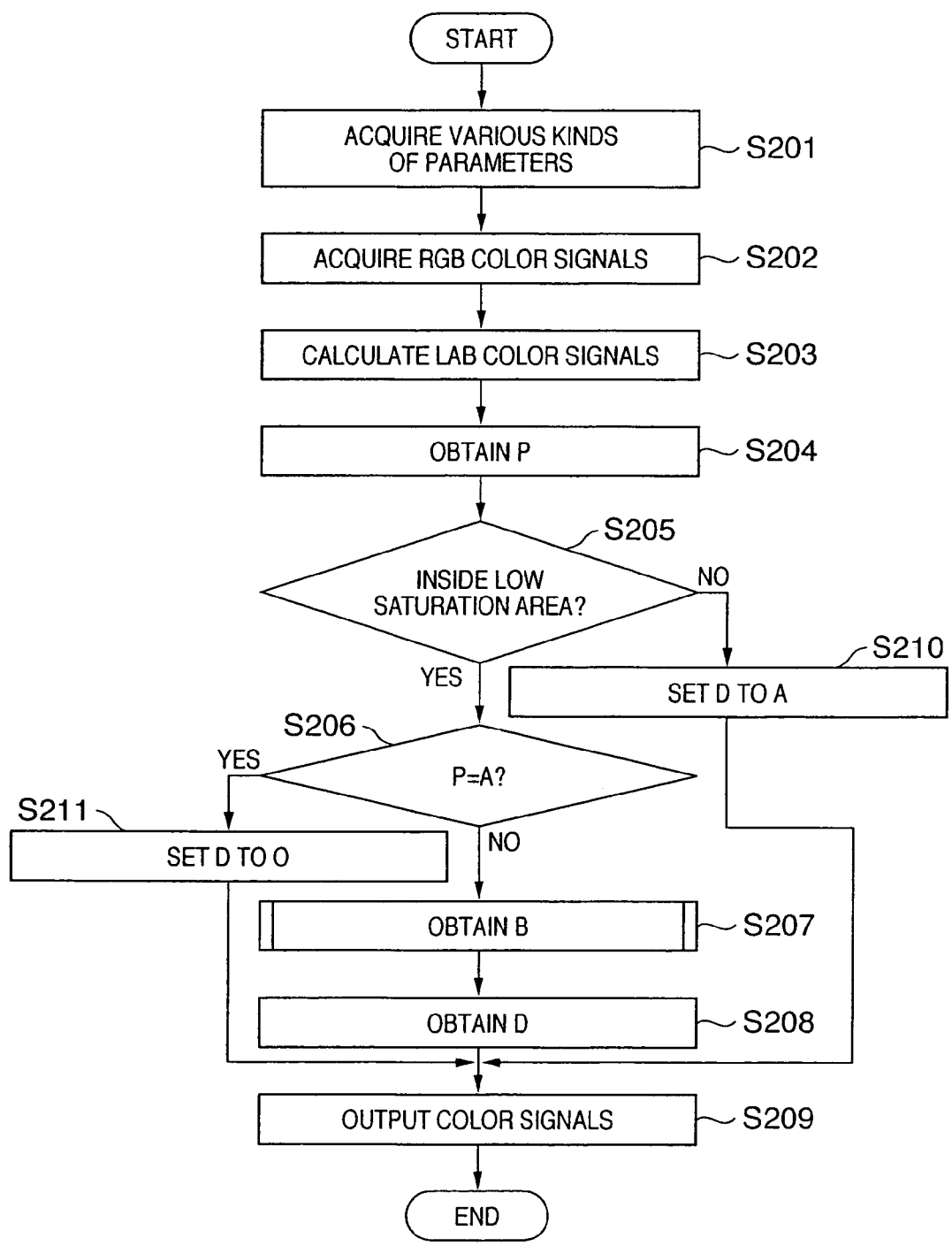
FIG. 2 is a flowchart for explaining a processing procedure of the color conversion method according to this embodiment.

A color conversion procedure for the color conversion method according to this embodiment will be described below. FIG. 2 is a flowchart for explaining a processing procedure for the color conversion method according to the first embodiment of the invention.

First of all, various parameters, a color conversion table, and a gray line table are acquired (step S201). The color signals RGB of the image output device that are converted color signals are acquired (step S202). And the color signals RGB acquired in step S202 are converted into the color signals Lab ((L*,a*,b*)=(L,a,b)) in the calorimetric color space (step S203). This conversion is performed by a well-known interpolation method, employing the color conversion table acquired in step S201.

The color conversion table stores the calorimetric values Lab corresponding to the lattice points ({R,G,B}, {0,0,0}, {0,0,32}, {0,0,64}, ... {0,0,255}, {0,32,0}, ... , {255,255, 255}) of nine slices for 8-bit RGB color signals, for example. The color signals Lab converted in step S203 are defined as the color signal A in the following.

The color signal P of gray for the image output device at the lightness of the color signal A is acquired (step S204). The color signal P is calculated employing the gray line table acquired in step S201. The calculation of the color signal P will be described later in detail.

Supposing that the low-saturation area including the color signal P and the color signal O that is calorimetrically achromatic at the lightness of the color signal A is denoted as area R, it is determined whether the color signal A is inside or outside the area R (step S205). As a result, if the color signal A is inside the area R (Yes), the procedure proceeds to step S206. On the other hand, if it is outside the area (No), the procedure goes to step S210.

In step S206, if the color signal A is inside the area R, the color signal P and the color signal A are compared. And if both are the same color signal (Yes), the procedure goes to step S211. On the contrary, if both are not the same color signal (No), the procedure goes to step S207.

In step S207, a color signal B at an intersection between the line segment connecting the color signal P and the color signal A and the outermost contour of the area R is acquired. If two intersections exist, the intersection closer to the color signal A is made the color signal B.

And in step S208, the color signal A is converted into an output color signal D ((L*,a*,b*)=(L',a',b')) in accordance with a conversion function for converting the color signal on the line segment BP connecting the color signal B and the color signal P into the color signal on the line segment BO connecting the color signal B and the color signal O. Then, the procedure proceeds to step S209.

On the other hand, if the color signal A is outside the area R in step S205 (No), the output color signal D is set to the color signal A (step S210), and the procedure goes to step S209. Also, if the color signal P and the color signal A are identical in step S206 (Yes), the output color signal D is set to the color signal O (step S211), and the procedure goes to step S209.

And in step S209, the output color signal D set in step S208, S210 or S211 is outputted. The processing contents of each step will be further described in detail.

<Low Saturation Area>

Figure 3:
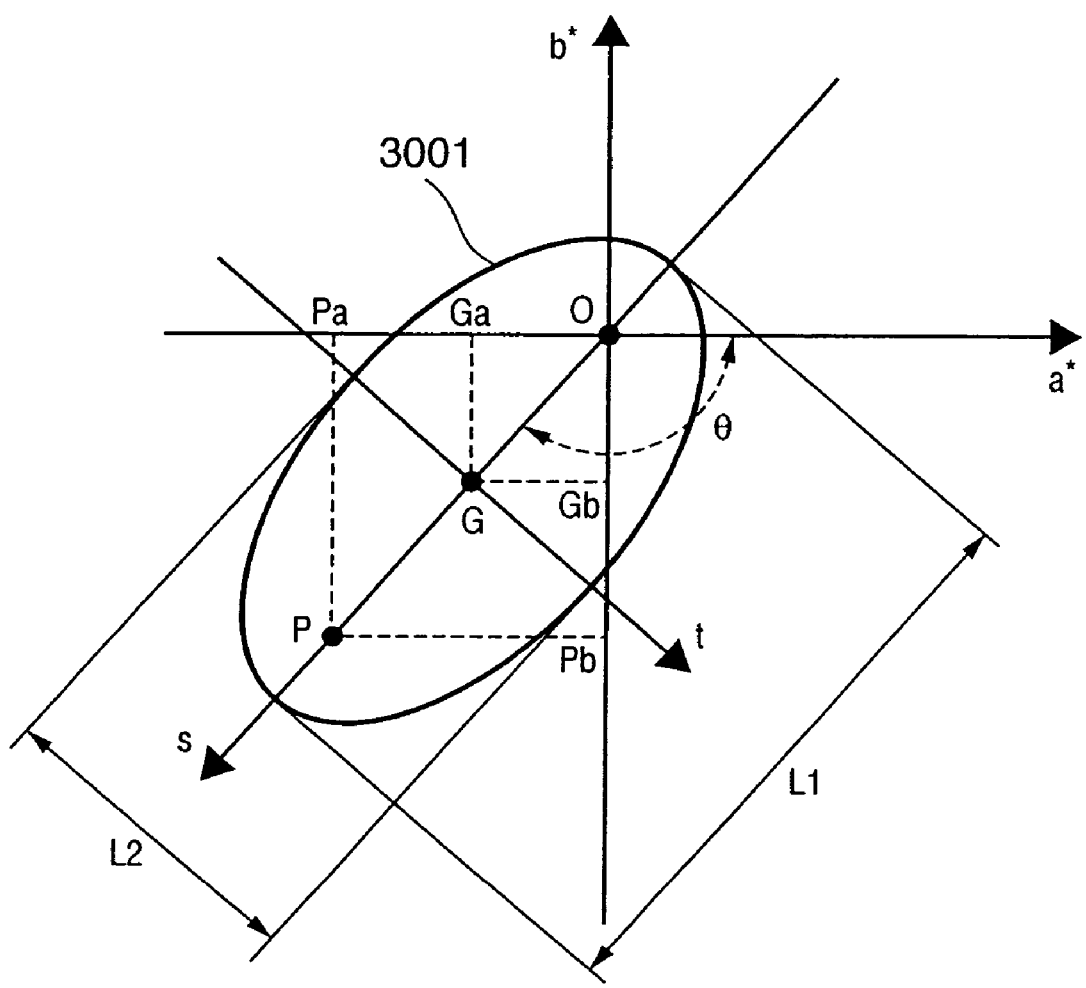
FIG. 3 is a typical view for explaining one example of a chromaticity plane (equal lightness section) in a low-saturation area R in a CIE/LAB color space according to this embodiment.

FIG. 3 is a typical view for explaining one example of a chromaticity plane (equal lightness section) in the low saturation area R in the CIE/LAB color space according to this embodiment. The low saturation area R of this embodiment is defined by an ellipse having a straight line connecting the color signal P indicating the gray of the image output device and the color signal O that is calorimetrically achromatic as the principal axis. In FIG. 3, the abscissa is a*, the ordinate is b*, point P is a point indicating the color signal P, point O is a point indicating the color signal O, 3001 is the outermost contour of the low saturation area R, θ is the angle made between the abscissa a* and the line segment OP, and point G is the center of the ellipse.

From the coordinates (Pa,Pb) of the point P and the coordinates (0,0) of the point O, the coordinates (Ga,Gb) of the point G are obtained in accordance with the following formulas:

$$Ga=Pa/2 \quad (1)$$

$$Gb=Pb/2 \quad (2)$$

The distance E between point O and point P is obtained in accordance with the following formula:

$$E=\sqrt{Pa^2+Pb^2} \quad (3)$$

Supposing that α and β are parameters acquired in step S201, the lengths L1 and L2 for the principal axis of the ellipse are obtained in accordance with the following formulas:

$$L1=E\times\alpha \quad (4)$$

$$L2=L2\times\beta \quad (5)$$

The parameter α is β value of one or greater (e.g., α=1.8), in which if the value is greater, the low saturation area is corrected more gently, but the range affected by correction is extended. On the other hand, if the value is smaller, the range affected by correction is narrowed, but the influence of correction for the low saturation area is more significant, possibly causing a gradation failure. Also, the parameter β decides the shape of ellipse, in which if β=1, a circle is obtained. For the parameter β, if the value is greater, the range affected by correction is extended, while if the value is smaller, the influence of correction for the low-saturation area is more significant, possibly causing a gradation failure.

Also, the st coordinate system which has the point G as the origin, and which is composed of the vector OP and the vector obtained by rotating the vector OP by 90 degrees counterclockwise is considered, as shown in FIG. 3. In FIG. 3, the conversion from (a*,b*) coordinates to (s,t) coordinates is conducted in accordance with the following formula:

$$\begin{pmatrix} s \\ t \end{pmatrix} = M \begin{pmatrix} a^* - Ga \\ b^* - Gb \end{pmatrix} \quad (6)$$

where M is the matrix given by the following formula:

$$M = \begin{pmatrix} \cos(\theta) & \sin(\theta) \\ -\sin(\theta) & \cos(\theta) \end{pmatrix} \quad (7)$$

where θ is the angle as shown in FIG. 3, and given by the following formula:

$$\theta=a\tan(Pa/Pb) \quad (8)$$

Also, the conversion from (s,t) coordinates to (a*,b*) coordinates is conducted in accordance with the following formula:

$$\begin{pmatrix} a^* \\ b^* \end{pmatrix} = M^{-1}\begin{pmatrix} s \\ t \end{pmatrix} + \begin{pmatrix} Ga \\ Gb \end{pmatrix} \quad (9)$$

<Calculation Method of Color Signal P>

Figure 4:
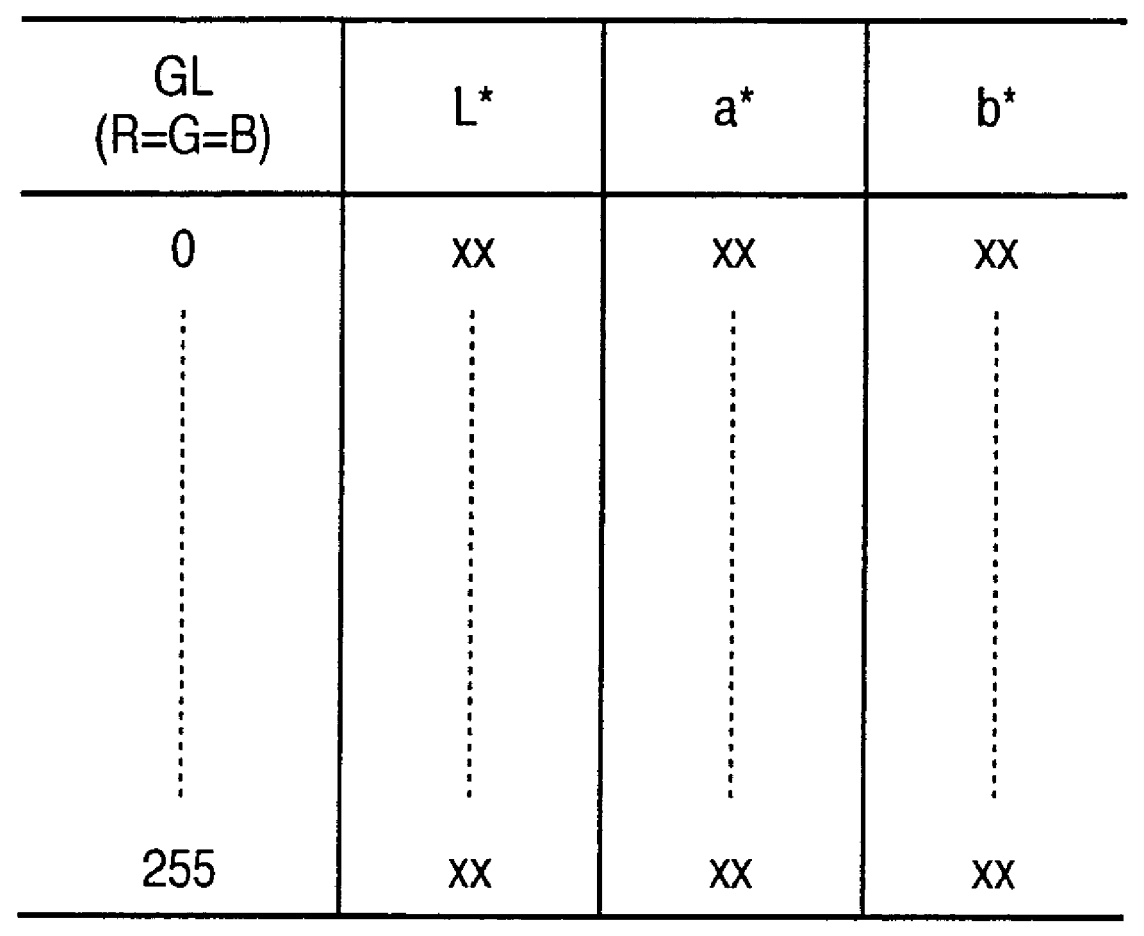

A calculation method of the color signal P in step S204 will be described below in detail. FIG. 4 is a diagram showing one example of the gray line table acquired in step S201. As shown in FIG. 4, the gray line table of this embodiment is the table storing the calorimetric value CIE/LAB pertaining to the discrete gray level GL. The gray level GL pertains to the color signal in which each of the R, G and B signals is identical. For example, the gray level 32 stores the calorimetric value when (R,G,B)=(32,32,32) is outputted by the image output device.

The values of chromaticity coordinates a*,b* at any lightness L are obtained employing the gray line table by the well-known interpolation method. That is, the color signal P is generated from the chromaticity coordinates and the lightness value L by calculating the chromaticity coordinates of the gray corresponding to the lightness value L of the color signal A by the well-known interpolation method, based on the gray line table acquired in step S201.

<Inside/Outside Determination Method>

An inside/outside determination method in step S205 will be described below in detail. In this example, the following determination process is performed to determine whether or not the color signal A is inside the low-saturation area R. That is, first of all, the chromaticity coordinates (a,b) of the color signal A are converted into the coordinate value (S,T) in the (s,t) coordinate system, employing formula (6). Then, an evaluation function Q is computed as follows:

$$Q=\sqrt{(2S/L1)^2+(2T/L2)^2} \quad (10)$$

where L1 and L2 are the lengths of the principal axis of the ellipse given by formulas (4) and (5). Also, when the value of the evaluation function Q in formula (10) is 1, the color signal A is located on the ellipse. Also, if Q is less than 1, the color signal A is located within the ellipse, namely, inside the low-saturation area R. Furthermore, if Q is greater than or equal to 1, the color signal A is outside the ellipse, namely, out of the low saturation area R.

When it is required that the color signal A on the ellipse is treated as belonging to either the inside or outside of the ellipse, the color signal A may be arbitrarily set, whether inside or outside of the ellipse. Therefore, in the following explanation, the color signal A on the ellipse is treated inside or outside the area by setting. To make the processing at the latter stage easier, the color signal A on the ellipse is preferably treated as the color signal outside the area.

<Calculation Method of Color Signal B>

A calculation method of color signal B in step S207 will be described below in detail. For the color signal (L,U,V) on the line segment Lpa connecting the color signal P(L,Pa,Pb) and the color signal A(L,a,b), L of the color signal is a fixed value, and V is decided from the value of U employing the following formula (11):

$$V(U)=(b-Pb/a-Pa)\times(u-Pa)+Pb \quad (11)$$

That is, the color signal on the line segment LPa is uniquely indicated by the value of U. The color signal B is given by one of the color signals, when one of the color signals on the line segment LPa corresponding to two U values having a sufficiently small difference is inside the low saturation area R and the other is outside the area R.

Figure 5:
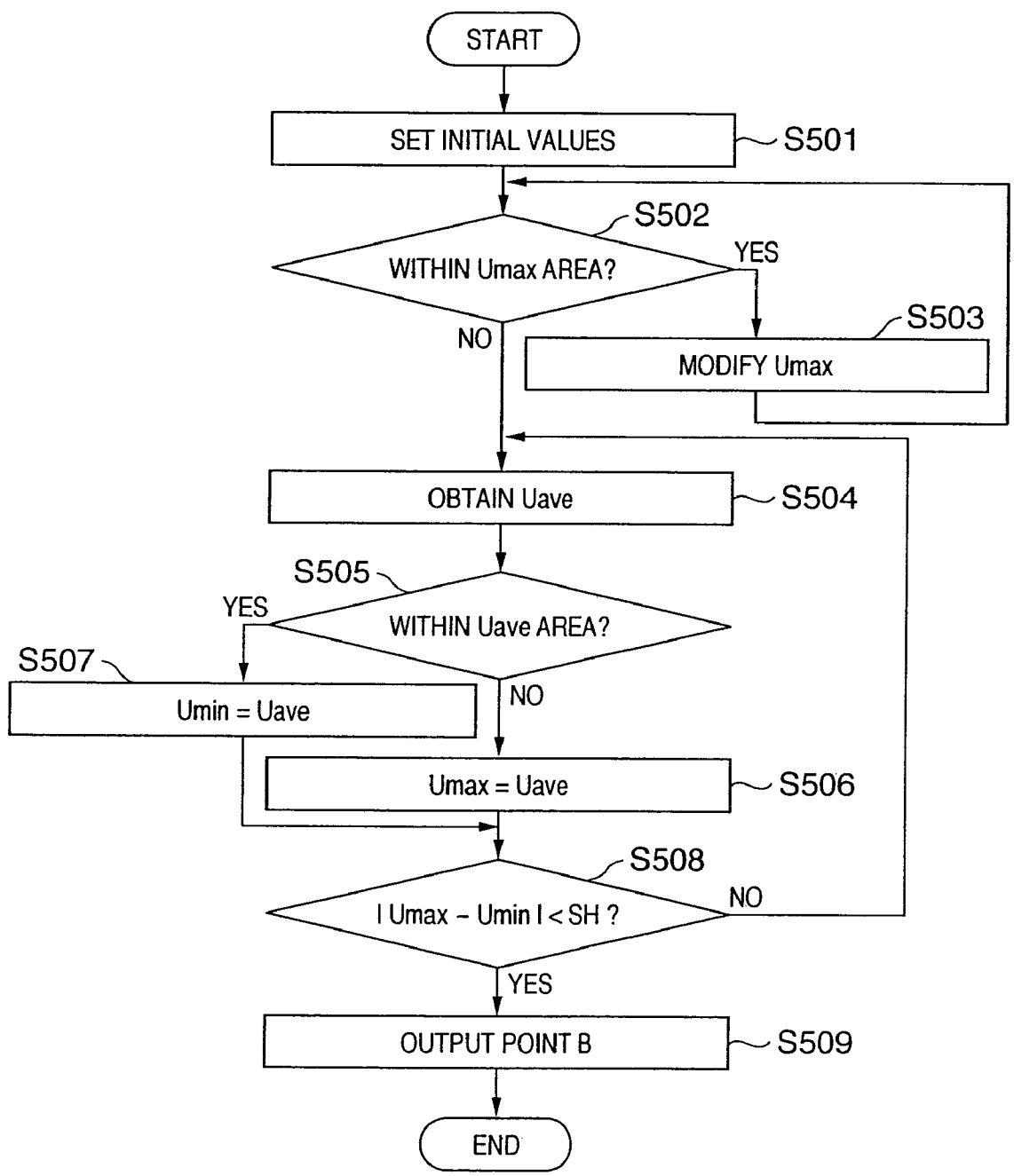
FIG. 5 is a flowchart for explaining the details of a calculation procedure of color signal B in step S207.

FIG. 5 is a flowchart for explaining the details of a calculation procedure of color signal B in step S207. In this embodiment, the color signal B is calculated in accordance with the following procedure. First of all, as the initialization, the U value Umin corresponding to the color signal inside the low saturation area R and the U value Umax corresponding to the color signal conceivably outside the low saturation area R are set at the initial values (step S501). For example, Umin is set at Pa, and Umax is set at 10 if Pa<a, or −10 if Pa>a.

Then, it is determined whether or not the color signal corresponding to Umax is inside the low saturation area R by the above method (step S502). Consequently, if the color signal is inside the area (Yes), the procedure goes to step S503, or if it is not (No), the procedure proceeds to step S504. Herein, the color signal corresponding to Umax is given by (L,Umax,V(Umax)), employing formula (11).

In step S503, which takes place when it is determined that the color signal is inside the area in step S502, Umax is modified so that the color signal corresponding to Umax may be outside the low saturation area R. After modification, the procedure returns to step S502. Herein, Umax is modified in accordance with the following formula:

$$U\text{max}=U\text{max}\times 2 \quad (12)$$

On the other hand, in step S504, which takes place when it is determined that the color signal is outside the area in step S502, the average value Uave of Umax and Umin is obtained in accordance with the following formula:

$$U\text{ave}=(U\text{max}+U\text{min})/2 \quad (13)$$

Then, the procedure proceeds to step S505.

In step S505, it is determined whether or not the chromaticity coordinates corresponding to Uave are located inside the low-saturation area R by the above method. Consequently, if they are inside the area R (Yes), the procedure goes to step S507, or if they are outside the area R (No), the procedure proceeds to step S506. If it is determined in step S505 that the color signal is outside the area, Umax is updated to Uave in step S506, and the procedure goes to step S508. On the contrary, if it is determined that the color signal is inside the area in step S505, Umin is updated to Uave in step S507, and the procedure goes to step S508.

In step S508, a difference between Umax and Umin is computed, and it is determined whether or not its absolute value is less than a predetermined value SH. Consequently, if the absolute value is less than SH (Yes), the procedure proceeds to step S509, or if the absolute value is greater than or equal to SH, the procedure returns to step S504. And in step S508, if the absolute value of the difference between Umax and Umin is less than the predetermined value SH, the color signal B is given by (L,Umin,V(Umin)), for example, and outputted (step S509).

On the other hand, the color signal B may be also calculated by the following method. First of all, the chromaticity coordinates of the color signal P and the chromaticity coordinates of the color signal A are converted into the (s,t) coordinate system, employing formula (6). Then, the straight line passing through two chromaticity coordinates after conversion is obtained. Supposing that the chromaticity coordinates in the (s,t) coordinate system corresponding to the chromaticity coordinates (Pa,Pb) of the color signal P are Pst(Ps,Pt), and the chromaticity coordinates in the (s,t) coordinate system corresponding to the chromaticity coordinates (a,b) of the color signal A are Ast(As,At), the straight line passing through the chromaticity coordinates Pst and the chromaticity coordinates Ast is given by the following formula (14):

$$\frac{s-Ps}{As-Ps}=\frac{t-Pt}{At-Pt} \quad (14)$$

Then, the ellipse making up the outermost contour of the low-saturation area R is obtained. Employing the lengths L1 and L2 of the principal axis given by formulas (4) and (5), this ellipse is given in accordance with the following formula (15):

$$\left(\frac{s}{L1/2}\right)^2+\left(\frac{t}{L2/2}\right)^2=1 \quad (15)$$

By solving the simultaneous equations of formulas (14) and (15), the intersection Bst (Bs,Bt) between the straight line and the ellipse is obtained. When the simultaneous equations have multiple solutions, the intersection Bst (Bs,Bt) is obtained as the solution in which La is smaller than Lp, where the distance between the chromaticity coordinates Pst and the chromaticity coordinates of the solution is Lp, and the distance between the chromaticity coordinates Ast and the chromaticity coordinates of the solution is La. Finally, the intersection Bst(Bs,Bt) is converted into the chromaticity coordinates (Ba,Bb) in the (a*,b*) coordinate system in accordance with the following formula (16):

$$\begin{pmatrix} Ba \\ Bb \end{pmatrix} = M^{-1} \begin{pmatrix} Bs \\ Bt \end{pmatrix} + \begin{pmatrix} Ga \\ Gb \end{pmatrix} \quad (16)$$

At this time, the color signal B pertaining to the color signal A(L,a,b) is given by (L,Ba,Bb).

<Conversion Function>

Figure 6:
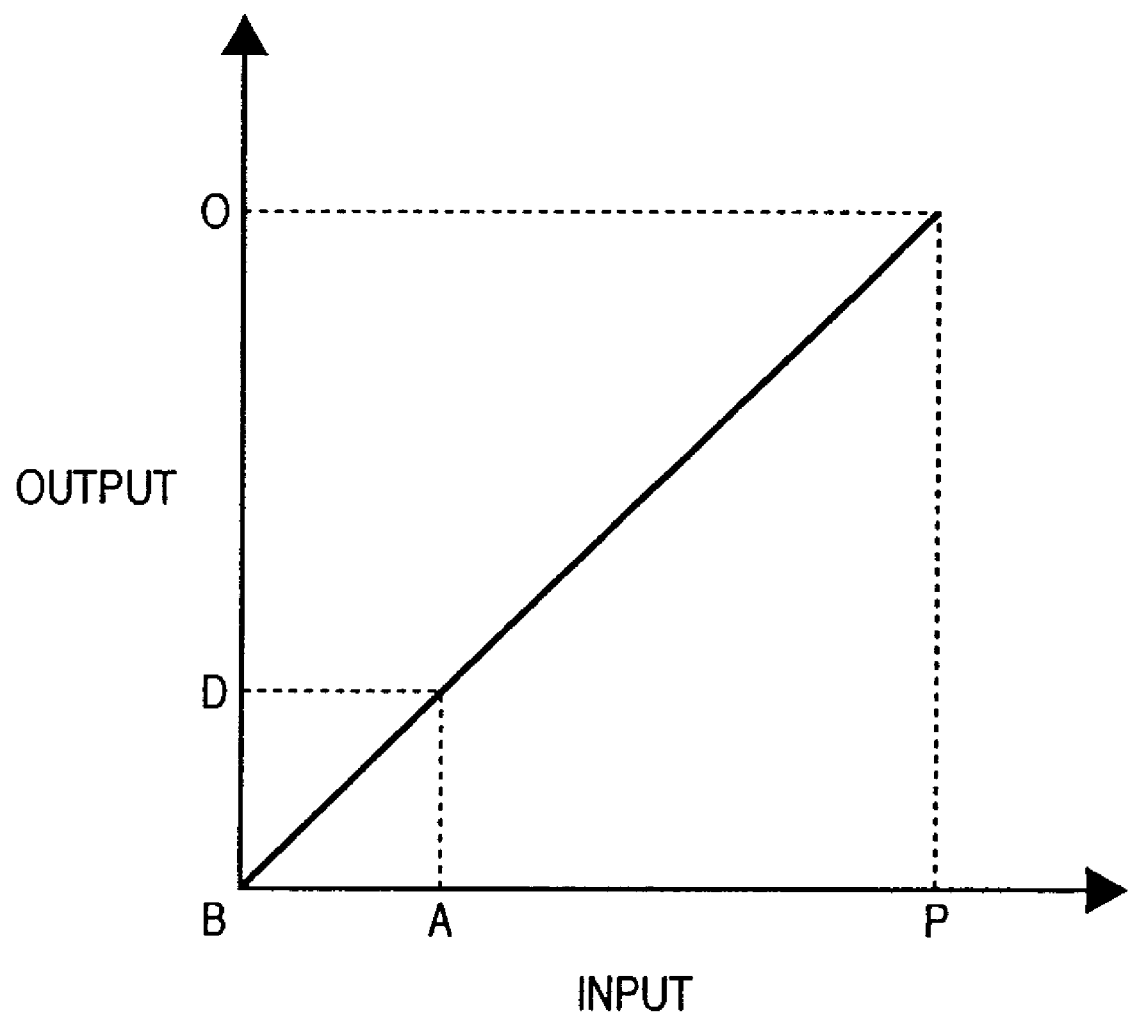
FIG. 6 is a diagram showing one example of a conversion function for use in this embodiment.
Figure 7:
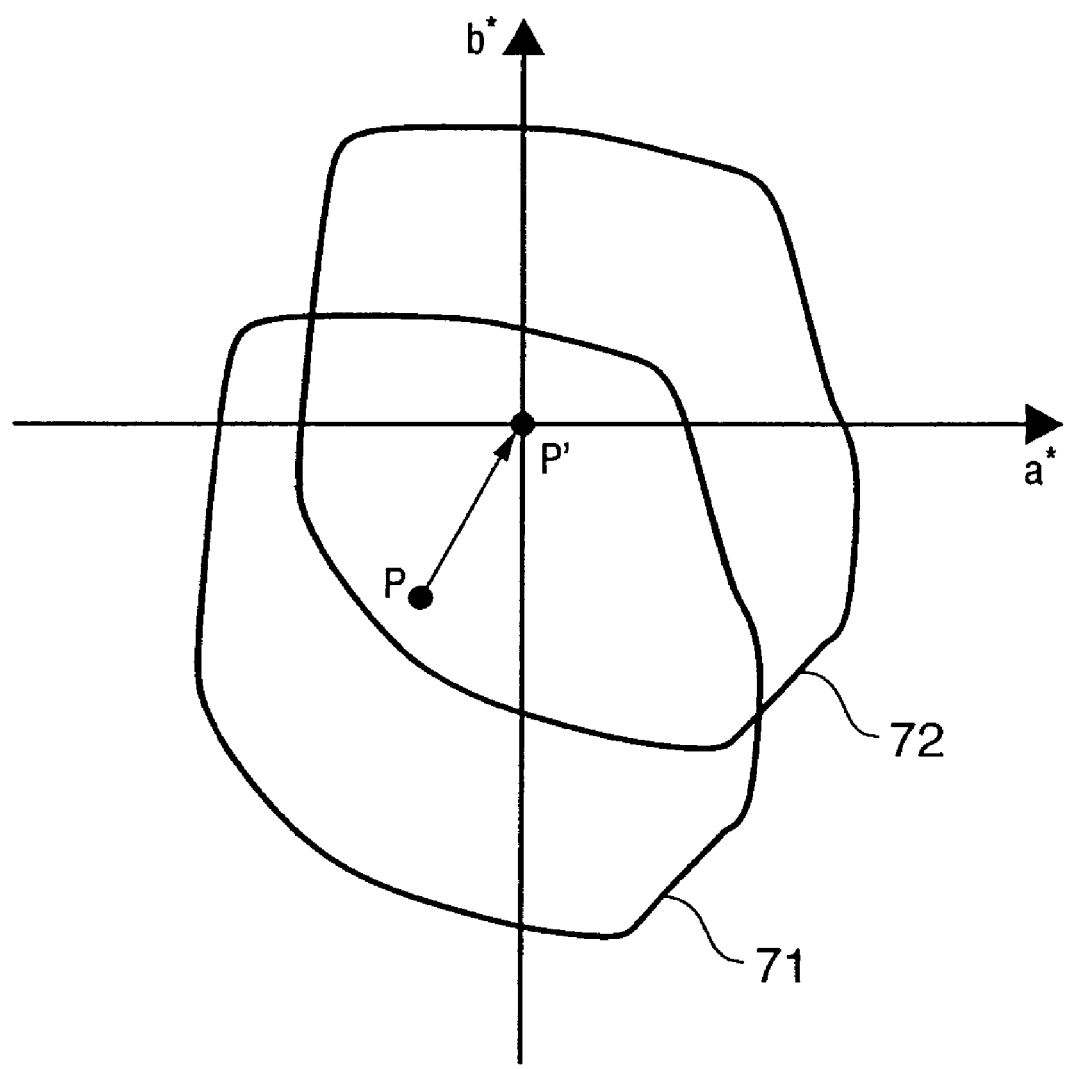
FIG. 7 is a diagram showing the relationship between calorimetric color space and color space S using the equal lightness plane in the CIE/LAB space.

A conversion function for converting the color signal A in step S208 will be described below in detail. The conversion function converts the color signal on the line segment BP into the color signal on the line segment BO, and converts the color signal A(L,a,b) that is the color signal on the line segment BP into the color signal D(L,a',b') on the line segment BO. FIG. 6 is a diagram showing one example of the conversion function for use in this embodiment. In FIG. 6, the abscissa is the color signal on the line segment BP that is the input value, and the ordinate is the color signal on the line segment BO that is the output value. The conversion function of this embodiment is a linear transformation, in which the color signal is converted so that the ratio of the distance of line segment BP to the distance of line segment BA may be equal to the ratio of the distance of line segment BO to the distance of line segment BD. That is, the color signal D is obtained in accordance with the following formulas (17) and (18):

$$a'=(a-Ba)/(Pa-Ba)\times(Oa-Ba)+Ba \quad (17)$$

$$b'=(b-Bb)/(Pb-Bb)\times(Ob-Bb)+Bb \quad (18)$$

As described above, with the color conversion method according to this embodiment, supposing that the color signal of gray dependent on the device is the color signal P, the color signal of achromatic color is the color signal O, and the predetermined low-saturation area including the color signal P and the color signal O is area R, the color signal that is not included in the area R is directly outputted. Also, for the color signal included in the area R, when arbitrary point on the outermost contour of the area R is point B, the color signal on the line segment BP connecting the color signal B and the color signal P is converted into the color signal on the line segment BO connecting the color signal B and the color signal O.

Due to this conversion, in the low-saturation area containing the gray dependent on the device, the gray is moved to the achromatic axis, and the color near the gray is smoothly transformed with gradations, whereby the dynamic range of the device can be utilized to the maximum while the "color cast" is suppressed. Furthermore, chromatic colors such as flesh (skin tone) colors outside the low-saturation area can be reproduced in the calorimetrically equivalent colors because their color signals are not converted. Consequently, if the color matching is performed in the color space for color matching based on this color conversion method, the image of the input system is excellently reproduced on the output system.

Although in this embodiment the CIELAB is employed as the color space, other uniform color spaces may be employed. More suitably, the color space of CAM may be employed.

Second Embodiment

In this embodiment, a profile of the image output device for use in the CMS is created by the color conversion method according to the first embodiment. A profile creation device will be described below.

<Functional Configuration>

Figure 11:
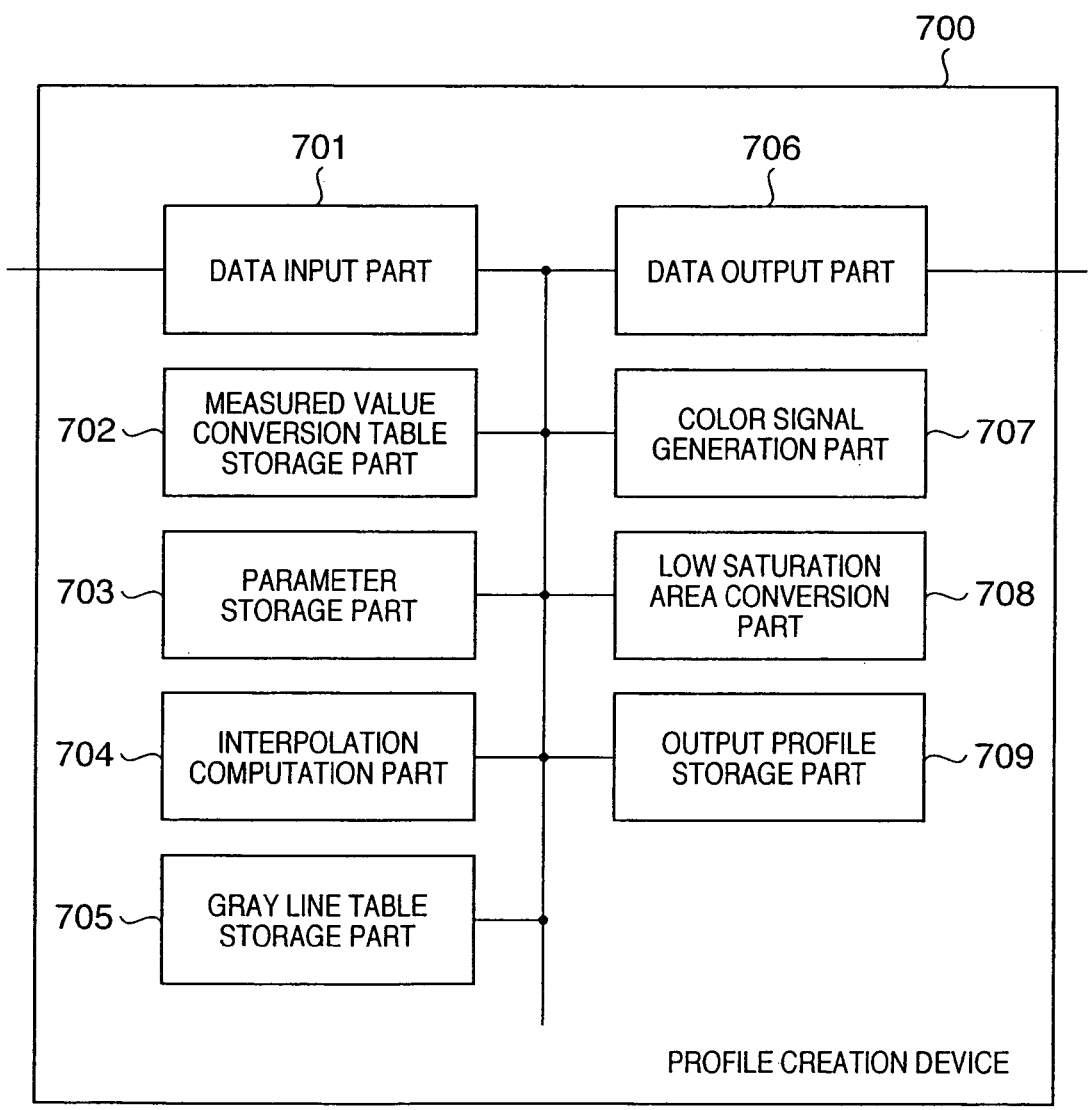
FIG. 11 is a diagram showing a functional configuration according to a second embodiment of the invention.

FIG. 11 is a block diagram showing a functional configuration example of the profile creation device according to this embodiment. As shown in FIG. 11, the profile creation device 700 of this embodiment comprises a data input part 701, a calorimetric value conversion storage table 702, a parameter storage part 703, an interpolation computation part 704, a gray line table storage part 705, a data output part 706, a color signal generation part 707, a low saturation area conversion part 708, and an output profile storage part 709.

The colorimetric value conversion table storage part 702 inputs and stores a colorimetric value conversion table of the image output device via the data input part 701. The profile creation device of this embodiment creates a profile (stored in the input system profile storage part 3004) for converting the color signal of the image output device into the color mapping color signal in the CMS as shown in FIG. 11.

The colorimetric value conversion table is the LUT of colorimetric values indicating the color reproduction characteristics of the image output device, as described in the first embodiment. For example, a color chart image composed of the 8-bit RGB color signals at lattice points of nine slices ({R,G,B}={0,0,0}, {0,0,32}, {0,0,64}, ..., {0,0,255}, {0,32,0}, ..., {255,255,255}) by the image output device, and the color of this output image is measured to acquire the colorimetric value conversion table. The parameter storage part 703 stores beforehand the parameters ($\alpha$ in the formula (4) and $\beta$ in the formula (5)) for deciding the shape of the low saturation area R, or acquires and stores them via the data input part 701. The interpolation computation part 704 computes the output color of the image output device corresponding to any input RGB color signals by a well-known interpolation method, employing the colorimetric value conversion table of the image output device stored in the colorimetic value conversion table storage part 702.

The gray line table storage part 705 stores the result of generating the discrete color signal of gray line in the color signal generation part 707 and computing the output color of the image output device corresponding to the color signal of gray line in the interpolation computation part 704. The gray line table is the table as shown in FIG. 4 and described in the first embodiment, for example. The low-saturation area conversion part 708 converts the discrete RGB color signals making up the LUT, which are generated by the color signal generation part 707, by the color conversion method as described in the first embodiment, employing the colorimetic value conversion table of the image output device stored in the calorimetric value conversion table storage part 702, the gray line table stored in the gray line table storage part 705, and the parameters stored in the parameter storage part 703, and stores the converted signals in the output profile storage part 709. The discrete RGB color signals making up the LUT are the 8-bit color signals at lattice points of nine slices ({R,G,B}={0,0,0}, {0,0,32}, {0,0,64}, . . . , {0,0,255}, {0,32,0}, ..., {255,255,255}), for example. The color signals stored in the output profile storage part 709 are outputted via the data output part 706.

<Profile Creation Procedure>

Figure 12:
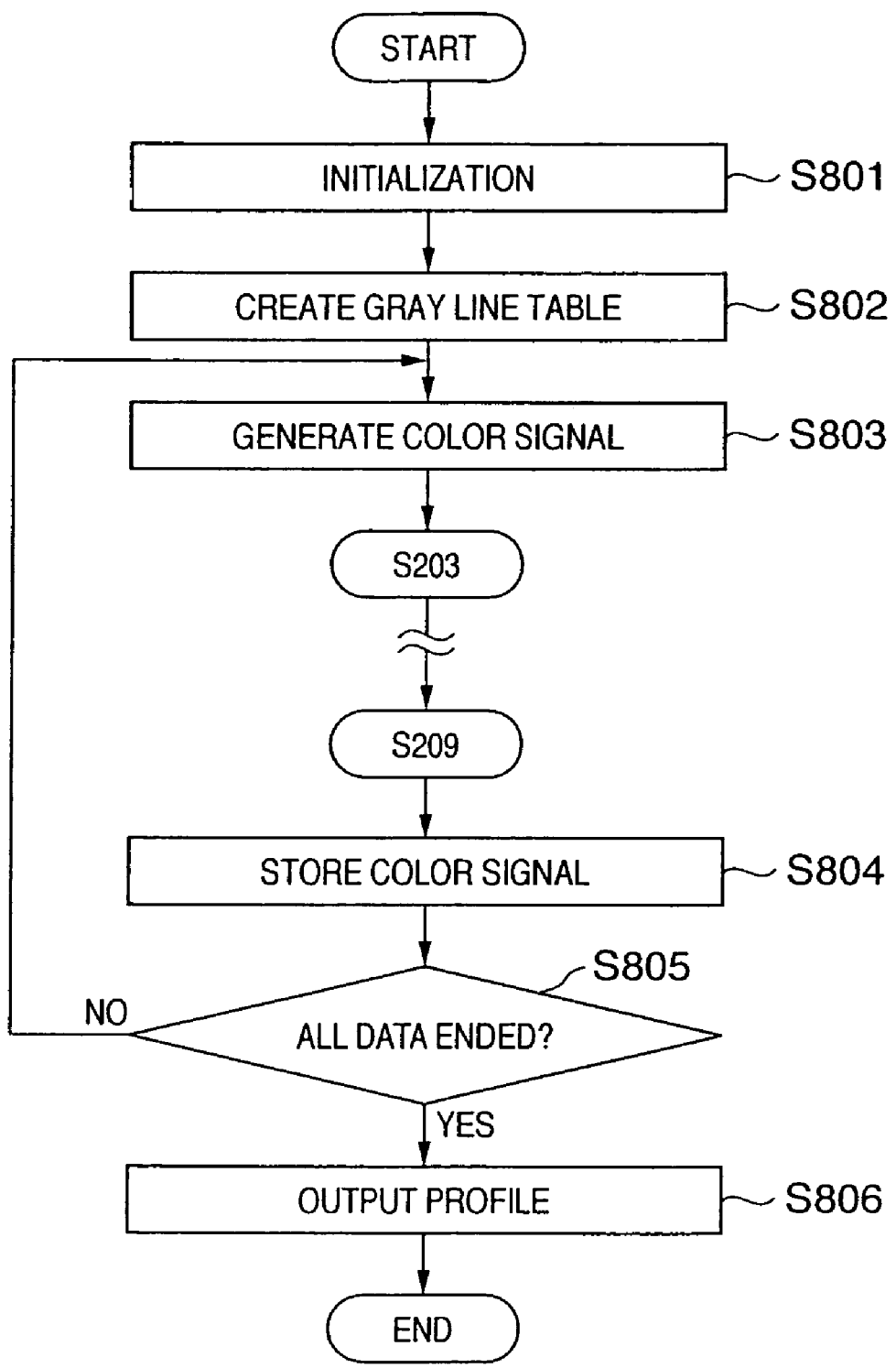
FIG. 12 is a flowchart showing a profile creation procedure according to the second embodiment.

Referring to a flowchart of FIG. 12, a profile creation procedure of this embodiment will be described below.

First of all, in step S801, an initialization process is performed. More specifically, the parameters for deciding the shape of the low saturation area R and the calorimetric value conversion table of the image output device are acquired and stored respectively in the parameter storage part 703 and the calorimetric value conversion table storage part 702. Then, in step S802, a gray line table is created, employing the calorimetric value conversion table acquired in step S801, and stored in the gray line table storage part 705. In step S803, the 8-bit RGB color signals at lattice points of nine slices making up the LUT for the profile are generated.

Subsequently, to acquire the color signal in the color mapping color space corresponding to the RGB color signals by the method according to the first embodiment, the flowchart of FIG. 2 is performed from step S203, whereby the color signal D in the color mapping color space corresponding to the RGB color signals are obtained in step S209. Then, the procedure proceeds to step S804.

In step S804, the color signal in the color mapping color space obtained in step S209 is stored in the output profile storage part 709. In step S805, it is determined whether or not for all the color signals making up the LUT of profile, the color signal in the corresponding color mapping color space is stored. If storing all the color signals is ended, the procedure proceeds to step S806, or if not, the procedure returns to step S803. Finally, in step S806, the output profile stored in the output profile storage part 709 is outputted.

As described above, the profile creation device of this embodiment, the profile creation device of this embodiment creates a profile of the image output device for use in the CMS using the color conversion method as described in the first embodiment. The CMS stores the profile created by the profile creation device of this embodiment in the input system profile storage part 3004, converts the gray line of the input system into the gray line of the output system, which is calorimetrically different, employing this profile, and for the color such as flesh color outside the predetermined low-saturation area, converts the color signal of the input system into the color signal of the output system to be reproduced in the color at the same calorimetric value as the input system.

In this embodiment, the gray line table is created, employing the calorimetric value conversion table stored in the calorimetric value conversion table storage part 702, but may be inputted via the data input part 701 separately.

Third Embodiment

In a third embodiment, a function of adjusting the size of the low-saturation area R interactively is added to the profile creation device as described in the second embodiment. A functional configuration of the profile creation device according to this embodiment and a profile creation procedure are identical to those of the second embodiment, and the characteristic function is only described in this embodiment.

<Parameter Setting UI>

Figure 8:
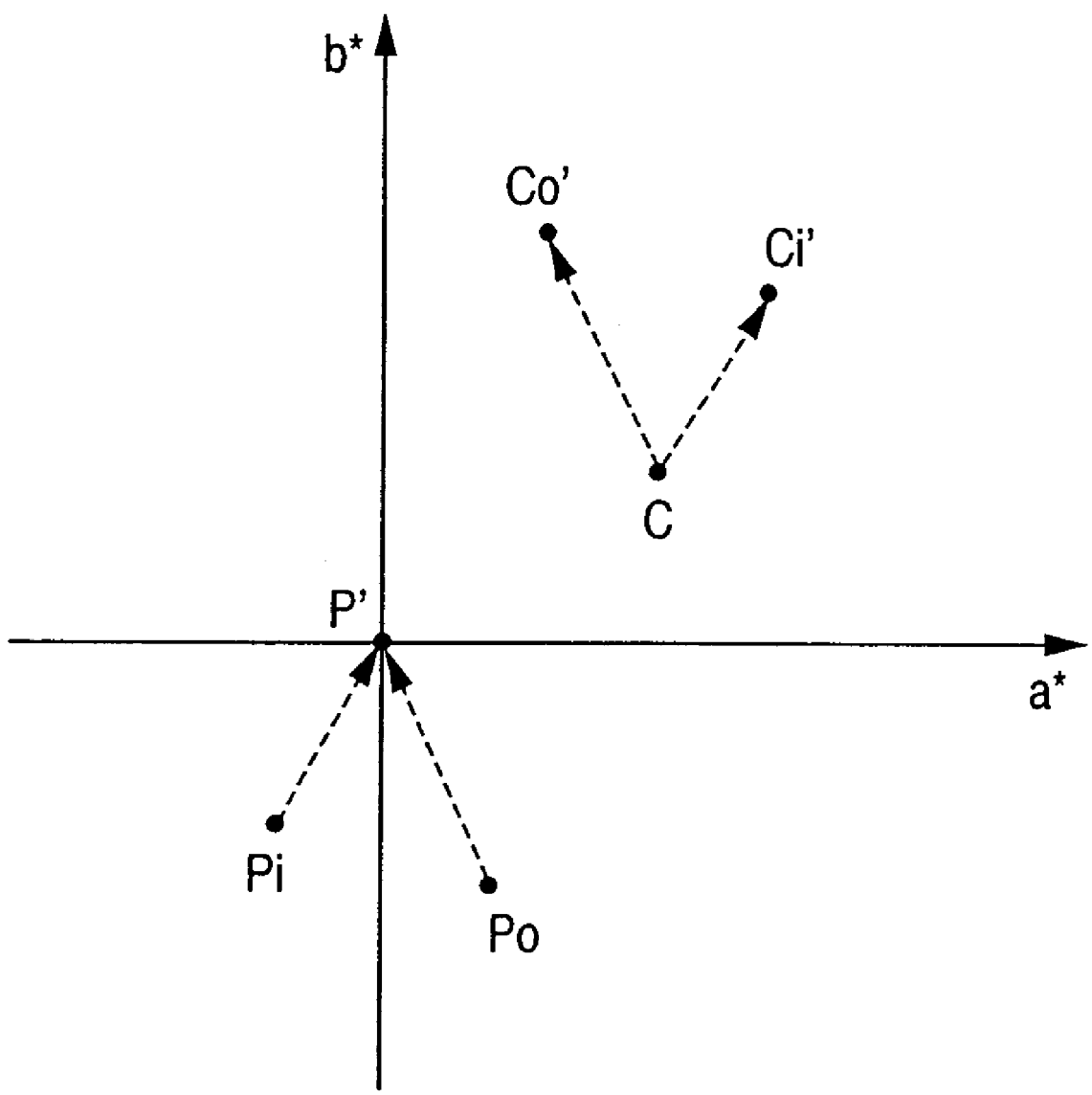
FIG. 8 is a diagram showing the equal lightness plane in the CIE/LAB space to explain the conventional color conversion method.

The profile creation device of this embodiment provides a UI (User Interface) for setting the parameters stored in the parameter storage part 703 in FIG. 11 interactively. This function is implemented as a part of the function of the data input part 701 in FIG. 11, and presented to the user at step of acquiring the parameters in step S801 in FIG. 8.

Figure 9:
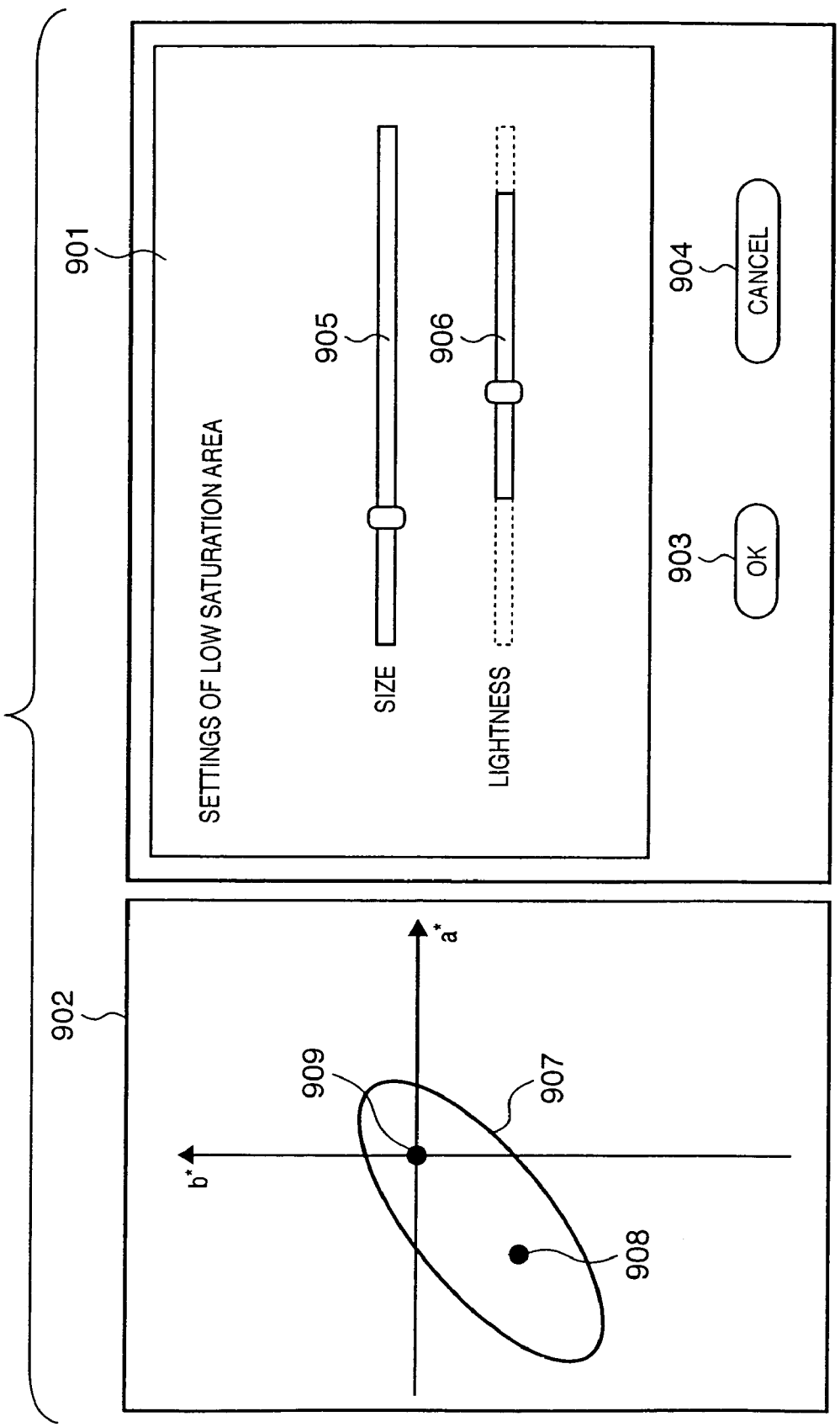
FIG. 9 is a diagram showing a parameter setting U1 according to a third embodiment of the invention.

FIG. 9 is a diagram showing one example of the UI that is provided by the profile creation device according to this embodiment, in which the UI comprises a parameter setting part 901, a low saturation area checking part 902, an OK button 903 and a cancel button 904.

This UI is displayed on a display unit and presented to the user, if the profile creation device is realized employing a general-purpose computer apparatus, commercially available on the market as the personal computer. And the user operates the UI, employing an input device represented by the keyboard or mouse which is usually employed for the UI operation. The operation result is reflected in real time to the UI, whereby the user can decide the set value interactively while checking the operation result.

The user setting function with the UI (GUI) is a well-known technique in the computer software, and not related with the essence of this embodiment. Therefore, the further explanation of this UI function is omitted here.

In FIG. 9, the parameter setting part 901 is composed of a control for setting the parameters, which, in an example of FIG. 9, has a slide bar 905 for specifying the size of the low saturation area and a slide bar 906 for specifying the lightness of equal lightness plane displayed on the low saturation area checking part 902.

The slide bar 905 is employed to set the parameter $\alpha$ of the formula (4), in which if the bar is moved to the right, the low-saturation area (area R) is increased, or if the bar is moved to the left, the low-saturation area is decreased. The size of the outermost contour 907 in the low-saturation area displayed on the low-saturation area checking part 902 is changed corresponding to the movement of the slide bar 905. The slide bar 906 is employed to set the lightness of the equal lightness plane displayed on the low-saturation area checking part 902, in which if the bar is moved to the right, the lightness is increased, or if the bar is moved to the left, the lightness is decreased. The lightness displayed on the low-saturation area checking part 902 is changed corresponding to the movement of the slide bar 906.

The low-saturation area checking part 902 illustrates a graph representing the equal lightness plane in the color space, having the outermost contour 907 in the low-saturation area, a chromaticity point 908 on the gray line of the device, and a point 909 indicating the achromatic color. If the OK button 903 is depressed, the value of the parameter dependent on the position of the slide bar is set, and stored in the parameter storage part 703. If the cancel button 904 is depressed, the setting is ignored.

Figure 10:
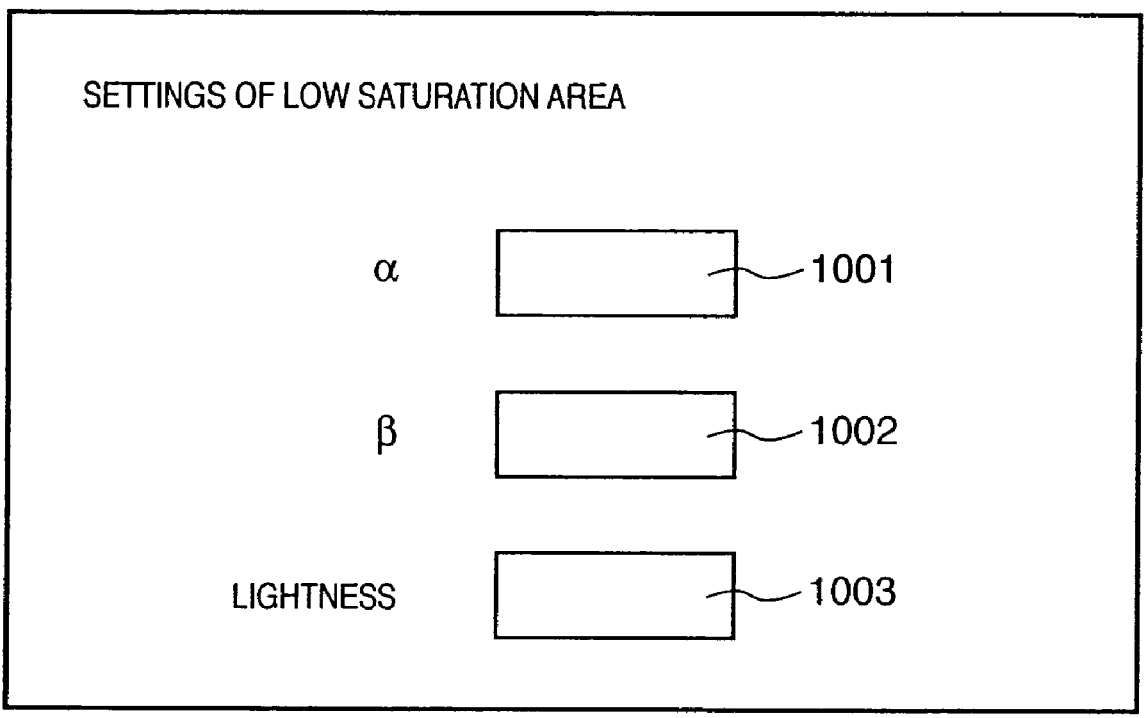
FIG. 10 is a diagram showing the parameter setting UI according to the third embodiment.

FIG. 10 is a diagram showing another UI example of the parameter setting part 901, in which the UI comprises a text box 1001 for specifying the parameter $\alpha$ of the formula (4) in numerical value directly, a text box 1002 for specifying the parameter $\beta$ of the formula (5), and a text box 1003 for specifying the lightness displayed on the low-saturation area checking part 902.

As described above, the parameter $\alpha$ is a value of one or greater, in which if the value is greater, the color signal in the low-saturation area is changed more gently, but the range affected by conversion is extended. On the contrary, if the value is smaller, the range affected by conversion is narrowed, but the color signal in the low-saturation area is rapidly changed, possibly causing a gradation failure. Also, the parameter $\beta$ decides the shape of ellipse, in which if $\beta=1$, a circle is obtained. For the parameter $\beta$, if the value is greater, the range affected by conversion is extended, while if the value is smaller, the color signal in the low saturation area is rapidly changed, possibly causing a gradation failure. If the OK button 903 is depressed, the value of the parameter dependent on the position of the slide bar is set, and stored in the parameter storage part 703. If the cancel button 904 is depressed, the setting is ignored.

When the cancel button 904 is depressed, the initial values that are prestored are employed as the values of $\alpha$ and $\beta$. In the example of FIG. 9, β is not specified, whereby even if the OK button is depressed, the value of β may remain the initial value.

With the profile created by the profile creation device of this third embodiment, like the profile created by the profile creation device of the second embodiment, the color conversion method of the first embodiment may be employed in which the color signal inside the low-saturation area and the color signal outside the low-saturation area are differently converted. And with the profile creation device of this embodiment, the user can set the size of the low-saturation area interactively.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, with the present invention, in conversion of color signals between the image output devices having different color reproduction characteristics, both a conversion required for the low saturation area and a conversion required for the chromatic color can be compatible, whereby an image reproduced on an input system is suitably reproduced on an output system. That is, in order to convert the color signal of the image output device into the color signal in the color space for color matching, the white color (gray) of a colorimetric value dependent on the device in the low saturation area is converted into the same color signal in the color space for color matching, and the chromatic color such as flesh color not dependent on the device is converted into the same colorimetric value color signal in the color space for color matching. With this configuration, in the color matching, the "color cast" is suppressed, and the dynamic range of the device is utilized to the maximum, whereby the chromatic color such as flesh color can be reproduced in the calorimetrically equal color.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-163751 filed on Jun. 1, 2004 and 2004-175998 filed on Jun. 14, 2004, which are hereby incorporated by reference herein.

What is claimed is:

1. A color conversion method for converting a color signal for an image output device into a color signal in a color space for color matching, comprising:
   an acquisition step of acquiring a color signal A of an image output device;
   a determination step of determining whether the color signal A is contained inside a low-saturation area on the color space containing a color signal P of gray for the image output device at a lightness of the color signal A and a color signal O that is colorimetrically achromatic color;
   a conversion step of converting the color signal A into a color signal D in accordance with a conversion function of converting the color signal on a line segment BP connecting a color signal B that is an intersection between a line segment connecting the color signal A and the color signal P and the outermost contour of the low saturation area and the color signal P into the color signal on a line segment BO connecting the color signal B and the color signal O, when the color signal A is contained in the low-saturation area in said determination step,
   wherein when the color signal A is not contained in the low-saturation area, the color signal is not converted in said conversion step.

2. The color conversion method according to claim 1, wherein the color space is a uniform color space.

3. The color conversion method according to claim 1, wherein said conversion step comprises setting the color signal D at a position on the line segment BO corresponding to the color signal A located on the line segment BP, so that a ratio of the length of the line segment BP to the length of the line segment BA may be equal to a ratio of the length of the line segment BO to the length of the line segment BD.

4. The color conversion method according to claim 1, wherein the color signal P, the color signal O and the color signal B are located on the equal lightness plane.

5. A color conversion method for converting a color signal for an image output device into a color signal in a color space for color matching, comprising:
- a first acquisition step of acquiring a color signal of an image output device;
- a first conversion step of converting the color signal into a color signal A on a colorimetric color space;
- a second conversion step of acquiring a color signal P of gray for the image output device at a lightness of the color signal A;
- a determination step of determining whether or not the color signal A is contained in a low-saturation area containing the color signal P and a color signal O of calorimetrically achromatic color at a lightness of the color signal A;
- a third acquisition step of acquiring a color signal B that is an intersection between a line segment connecting the color signal P and the color signal A and the outermost contour of the low-saturation area, when it is determined that the color signal A is contained in the low-saturation area at said determination step;
- a second conversion step of converting the color signal A into a color signal D in accordance with a conversion function of converting the color signal on the line segment connecting the color signal B and the color signal P into the color signal on the line segment connecting the color signal B and the color signal O; and
- an output step of outputting the color signal D.

6. The color conversion method according to claim 5, wherein said third acquisition step comprises acquiring an intersection closer to the color signal A as the color signal B, when there are a plurality of intersections between the line segment connecting the color signal P and the color signal A and the outermost contour of the low-saturation area.

7. The color conversion method according to claim 5, further comprising a setting step of setting the color signal A as the color signal D, when it is determined in said determination step that the color signal A is not contained in the low-saturation area.

8. The color conversion method according to claim 5, further comprising a setting step of setting the color signal O as the color signal D, when it is determined in said determination step that the color signal A is contained in the low-saturation area and the color signal P is the same as the color signal A.

9. The color conversion method according to claim 5, wherein said second conversion step comprises converting the color signal A into the color signal D, so that a ratio BP/BA of the distance BP between the color signal B and the color signal P to the distance BA between the color signal B and the color signal A may be equal to a ratio BO/BD of the distance BO between the color signal B and the color signal O to the distance BD between the color signal B and the color signal D.

10. A computer-readable recording medium storing a program which causes a computer to perform a method according to claim 5.

11. A color conversion method for converting a color signal of a predetermined image output device into a color signal in a color mapping color space that is a common color space for mutually converting the color signals of plural kinds of image output devices, comprising:
- a first conversion step of converting the color signal of the predetermined image output device into a color signal A in a uniform color space;
- a determination step of determining whether the color signal A exists inside a low-saturation area R that is set in the uniform color space; and
- a second conversion step of converting the color signal A in the uniform color space into the color signal in the color mapping color space,
- wherein said second conversion step comprises converting the color signal A into the color signal on a line segment connecting the color signal that is achromatic color in the uniform color space and an outermost contour of the low-saturation area R when the color signal A exists inside the low-saturation area R, and outputting the color signal A without conversion, when the color signal A exists outside the low-saturation area R.

12. The color conversion method according to claim 11, wherein supposing that a color signal having the same lightness as the color signal A on the gray line of the predetermined image output device is the color signal P, and a color signal indicating achromatic color in the uniform color space is a color signal O, the low-saturation area R is defined as the area containing the signal P and the signal O.

13. A computer-readable recording medium storing a program which causes a computer to perform a method according to claim 11.

14. A profile creation device for creating the profile data for mutually converting a color signal of a predetermined image output device into a color signal in a color mapping color space that is a common color space for mutually converting the color signals of plural kinds of image output devices, comprising:
- first conversion means for converting a discrete color signal C of the predetermined image output device into a color signal A in a uniform color space;
- a determination means for determining whether the color signal A exists inside a low-saturation area that is set in the uniform color space;
- second conversion means for converting the color signal A into a color signal D in the color mapping color space; and
- profile creation means for creating a profile from the correspondent information between the discrete color signal C and the color signal D,
- wherein said second conversion means converts the color signal A into the color signal on a line segment connecting the color signal that is achromatic color in the uniform color space and a outermost contour of the low-saturation area R when the color signal A exists inside the low-saturation area R, and outputs the color signal A without conversion into the color signal on the line segment connecting the color signal that is achromatic color in the uniform color space and the outermost contour of the low-saturation area R when the color signal A exists outside the low-saturation area R.

15. The profile creation device according to claim 14, wherein supposing that a color signal having the same lightness as the color signal A on the gray line of the predetermined image output device is a color signal P, and a color signal indicating achromatic color in the uniform color space is a color signal O, the low-saturation area R is defined as an area containing the signal P and the signal O.

16. The profile creation device according to claim 14, further comprising UI presentation means for presenting a user interface for enabling the user to set the parameters for controlling the size of the low-saturation area R, and area decision means for deciding the low-saturation area R based on the parameters set via said user interface.

17. A profile creation method for creating the profile data for mutually converting a color signal of a predetermined image output device and a color signal in a color mapping color space that is a common color space for mutually converting the color signals of plural kinds of image output devices, comprising:

a first conversion step of converting a discrete color signal C of the predetermined image output device into a color signal A in a uniform color space;

a determination step of determining whether the color signal A exists inside a low-saturation area that is set in the uniform color space;

a second conversion step of converting the color signal A into a color signal D in the color mapping color space; and a profile creation step of creating a profile from the correspondent information between the discrete color signal C and the color signal D;

wherein said second conversion step comprises converting the color signal A into the color signal on a line segment connecting the color signal that is achromatic color in the uniform color space and the outermost contour of the low-saturation area R when the color signal A exists inside the low-saturation area that is set in the uniform color space, and outputting the color signal A without converting into the color signal on the line segment connecting the color signal that is achromatic color in the uniform color space and a outermost contour of a low-saturation area R when the color signal A exists outside the low-saturation area that is set in the uniform color space.

* * * * *